United States Patent [19]
Sawanobori et al.

[11] Patent Number: 5,936,668
[45] Date of Patent: Aug. 10, 1999

[54] COLOR IMAGE DISPLAY DEVICE

[75] Inventors: Keiji Sawanobori; Nobuhiro Tani, both of Tokyo, Japan

[73] Assignee: Asahi Kogaku Kogyo Kabushiki Kaisha, Tokyo, Japan

[21] Appl. No.: 08/722,622

[22] Filed: Sep. 27, 1996

[30]     Foreign Application Priority Data

Oct. 2, 1995   [JP]   Japan .................................. 7-278428

[51] Int. Cl.⁶ ........................ H04N 5/222; H04N 3/14; H04N 5/445; G09G 3/36
[52] U.S. Cl. ........................ 348/333; 348/273; 348/564; 345/103
[58] Field of Search ................................. 348/333, 334, 348/790, 791, 761, 273, 274, 275, 832, 835, 564, 588, 36, 208; 345/72, 88, 89, 153, 103, 87, 93; 349/108, 109, 104, 106

[56]              References Cited

U.S. PATENT DOCUMENTS

| | | | |
|---|---|---|---|
| 3,750,135 | 7/1973 | Carey et al. .............................. | 348/552 |
| 5,402,171 | 3/1995 | Tagami et al. ............................ | 348/219 |
| 5,513,025 | 4/1996 | Watanabe et al. ........................ | 349/106 |
| 5,515,104 | 5/1996 | Okada ....................................... | 348/334 |
| 5,559,554 | 9/1996 | Uekane et al. ............................ | 348/333 |
| 5,600,344 | 2/1997 | Sono et al. ................................ | 345/103 |
| 5,668,597 | 9/1997 | Parulski et al. .......................... | 348/350 |

*Primary Examiner*—Wendy Garber
*Assistant Examiner*—Luong Nguyen
*Attorney, Agent, or Firm*—Greenblum & Bernstein P.L.C.

[57]              ABSTRACT

Disclosed is a displaying device provided with a displaying screen, and a color filter thereon. The displaying screen has at least a first and a second displaying areas. A normal image is displayed on the first displaying area, and information is displayed on the second displaying area. The color filter is into at least a first and a second filter areas respectively corresponding to the at least a first and a second displaying areas. The first filter area consists of a plurality of filter elements arranged in accordance with a first arrangement, and the second filter area consists of a plurality of filter elements arranged in accordance with a second arrangement which is different from said first arrangement.

23 Claims, 8 Drawing Sheets

COLOR IMAGE DISPLAY DEVICE

BACKGROUND OF THE INVENTION

The present invention relates to a color image displaying device which can be used as a monitoring display for an electronic still video camera.

Conventionally, electronic still video cameras provided with LCDs (Liquid Crystal Displays) used for displaying reproduced color images of objects are known. In the electronic still video camera, which is capable of capturing color images, color filters are provided in front of the image receiving element such as a CCD (Charge Coupled Device), and image signals corresponding to a plurality of color components are generated by the CCD and stored in a recording medium such as a flash memory, respectively.

Generally, the LCD of the electronic still camera is capable of displaying the same image as captured by the CCD. In other words, an aspect ratio, or the ratio of the length of a horizontal edge (i.e., the width) to the length of a vertical edge (i.e., the height) of the image receiving area of the CCD is similar to that of the LCD- Further, in the electronic still video camera, what is displayed on the LCD is stored in a recording medium such as a flash memory as it is. In other words, in the electronic still video camera, the LCD functions as a finder, and what is seen on the LCD is what is stored in the recording medium.

On the other hand, in a well-known camera using a film as the recording medium, and provided with an optical finder system, what is observed through the optical finder system coincides with what is recorded (i.e., photographed on the film), since the aspect ratio of the finder frame is similar to the aspect ratio of the photographing frame of the film.

When the functions of the above-described cameras, i.e., the electronic still video camera and the normally used optical camera are incorporated in one camera, a problem indicated below arises.

Generally, the aspect ratio of the film frame is less than the aspect ratio of the image receiving surface of the CCD. That is, when the widths of the image receiving area and the light receiving area have the same length, the height of the film frame is less than the height of the image receiving area of the CCD.

If the aspect ratio of the LCD remains similar to the aspect ratio of the image receiving area of the CCD, and if an image is to be recorded on the film, a problem arises in that the image displayed on the LCD is different from what is recorded on the film. Specifically, in the above case, the upper portion (and/or the lower portion) of the image displayed on the LCD, at a landscape framing, may not be recorded on the recording medium (i.e., on the film) due to the difference of the aspect ratios between the image receiving area of the recording medium and the image displayed on the screen of the LCD. If such an LCD is used as a finder for the camera, the displayed image does not coincide with the image to be recorded.

SUMMARY OF THE INVENTION

It is therefore an object of the invention to provide an improved displaying device which enables an operator to recognize images to be captured an recorded in the recording medium even if the aspect ratio of the displaying device is different from the aspect ratio of the image to be recorded, and further provides a color filter optimum for such a displaying device.

For the above object, according to the invention, there is provided a displaying device comprising:

a displaying screen having at least first and second displaying areas, an image being displayed on the first displaying area, information different from the image displayed on the first area being displayed on the second displaying area;

a color filter provided on the screen, the color filter being divided into at least first and a second filter areas, respectively, corresponding to the at least first and second displaying areas;

wherein the first filter area consists of a plurality of filter elements arranged in accordance with a first arrangement, and wherein the second filter area consists of a plurality of filter elements arranged in accordance with a second arrangement which is different from the first arrangement.

Optionally, the second displaying area is provided along at least one side of the displaying screen.

It is possible to have two second displaying areas which are provided along opposite sides of the displaying screen The displaying device may display images in response to an image signal obtained by an image receiving element. In such a case, the aspect ratio of the displaying screen can be greater than the aspect ratio of the image receiving surface of an image receiving surface of the image receiving element.

The aspect ratio of the displaying screen is 3:2, and the aspect ratio of the image receiving surface is 4:3.

The first filter elements can be divided into elements corresponding to a plurality of color components, and the second filter elements can also be divided into elements corresponding to a plurality of color components, wherein at least one color component corresponding to the second filter elements can be different from any color component corresponding to the first filter elements.

Optionally, the first arrangement is an inclined stripe arrangement. Further, the second arrangement is a vertical stripe arrangement. Alternatively, the second color filter elements comprises white color elements.

Further alternatively, the second color filter elements includes a plurality of parts respectively consisting of color filter elements for different colors. In this case, the different colors may include yellow, white and red.

According to another aspect of the invention, there is provided an image recording apparatus for recording image information in a recording medium, comprising:

a displaying device having a displaying screen, the displaying screen having at least first and second displaying areas, an image being displayed on the first displaying area, information different from the image displayed on the first area being displayed on the second displaying area;

a color filter provided on the screen, the color filter being divided into at least first and second filter areas, respectively, corresponding to the at least first and second displaying areas;

wherein the first filter area comprises a plurality of filter elements arranged in accordance with a first arrangement, and wherein the second filter area comprises a plurality of filter elements arranged in accordance with a second arrangement which is different from the first arrangement.

Optionally, an entire image displayed on the first area is recorded to the recording medium.

The recording medium may be a film, and the displaying device may include a liquid crystal display.

According to a further aspect of the invention, there is provided a color filter, comprising:

a first filter having a plurality of filter elements arranged in accordance with a first arrangement; and a second filter having a plurality of filter elements arranged in accordance with second arrangement which is different from the first arrangement.

Optionally, the second filter is provided along at least one side of the displaying screen.

Further, it is possible that there are two second filters which are provided along opposite sides of the displaying screen.

Further, optionally, the first filter elements may be divided into elements corresponding to a plurality of color components, and the second filter elements may also be divided into elements corresponding to a plurality of color components, wherein at least one color component corresponding to the second filter elements is different from any color component corresponding to the first filter elements, Optionally, the first arrangement is an inclined stripe arrangement. Further, the second arrangement is a vertical stripe arrangement. Alternatively, the second color filter elements comprises white color elements.

Further alternatively, the second color filter elements includes a plurality of parts respectively consisting of filter elements corresponding to different colors. In this case, the plurality of parts may include parts respectively consisting of yellow, white and red color filter elements.

DESCRIPTION OF THE ACCOMPANYING DRAWINGS

DETAIL DESCRIPTION OF THE EMBODIMENTS

Figure 1:
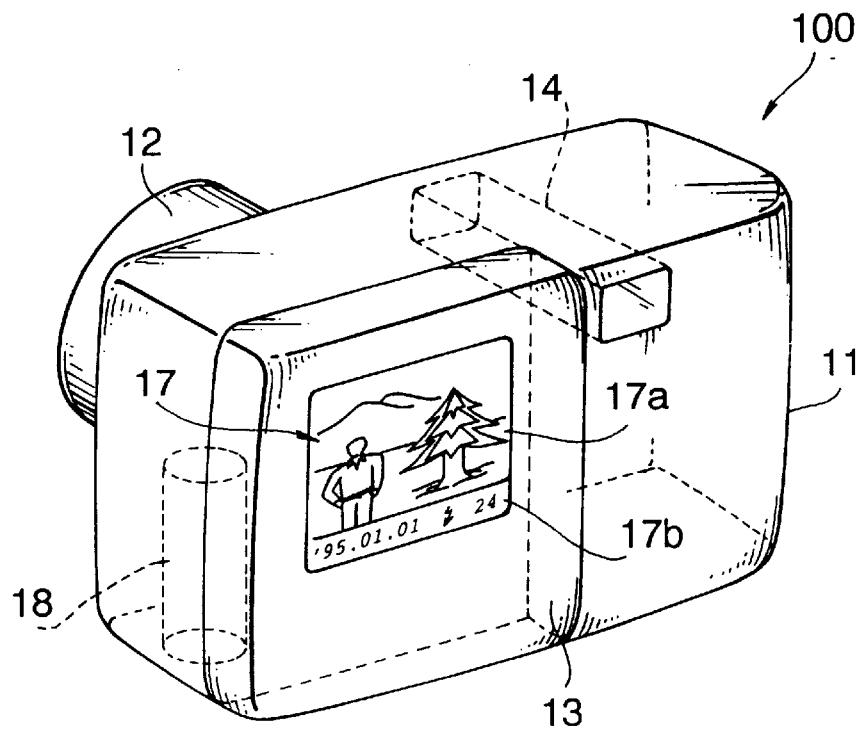
FIG. 1 is a perspective view, seen from backwards, of an electronic still video camera provided with a displaying device embodying the present invention.
Figure 2:
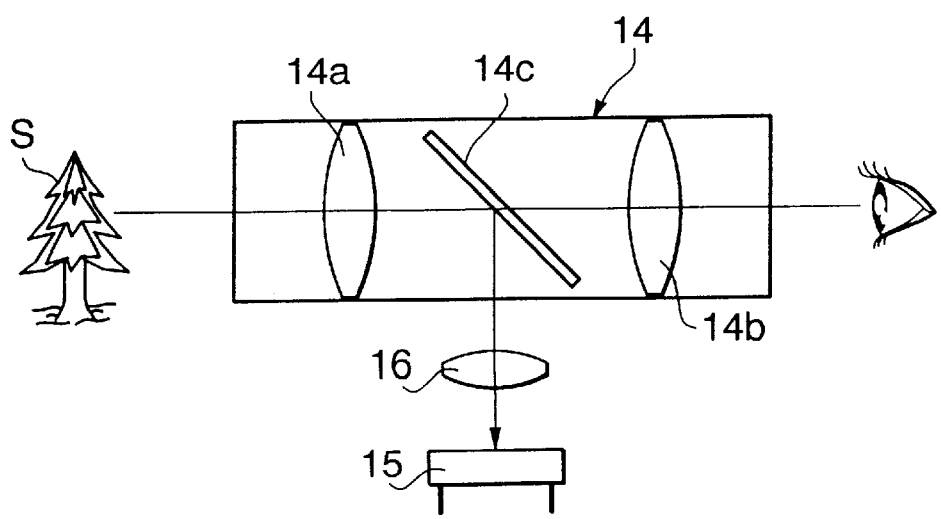
FIG. 2 shows a schematic structure of a finder optical system employed in the camera shown in FIG. 1.

FIG. 1 is a perspective view, seen from backwards, of an electronic still video camera 100 provided with a displaying device 13 as a first embodiment of the present invention, and FIG. 2 shows a schematic structure of a finder optical system employed in the camera shown in FIG. 1.

The camera 100 has a body 11, and a built-in displaying device 13. On a front surface of the camera body 11, a lens unit 12 is provided. On a back side of the camera body 11, the displaying device 13 is provided. Adjacent to the displaying device 13, a finder system 14 is provided. As shown in FIG. 2, the finder system 14 includes a first lens 14a, a second lens 14b, and a half mirror 14c provided between the first and second lenses 14a and 14b. Below the half mirror 14c, a CCD (Charge Coupled Device) 15 is provided. Between the half mirror 14c and the CCD 15, a converging lens 16 is provided. An operator of the camera is able to observe an image of an object S through the first lens 14a, the half mirror 14c and the second lens 14b. A part of light reflected by the half mirror 14c is incident onto the image receiving surface of the CCD 15 through the converging lens 16. Thus an optical image of the object S is formed on the image receiving surface of the CCD 15.

The displaying device 13 is a image reproducing device provided with an LCD (Liquid Crystal Display) 17. An image signal is transmitted from the CCD 15 to the displaying device 13, and therefore, an animating image (i.e., a real time image) of the object S is displayed on the screen of the LCD 17. Thus, the LCD 17 can be used as another finder.

In the camera body 11, a film 18, which is a recording medium of an optical image, is loaded. As described above, the camera 11 is also provided with the CCD 15. The image signal generated by the CCD 15 can be stored in a image signal recording medium, such as an IC memory card.

Figure 3:
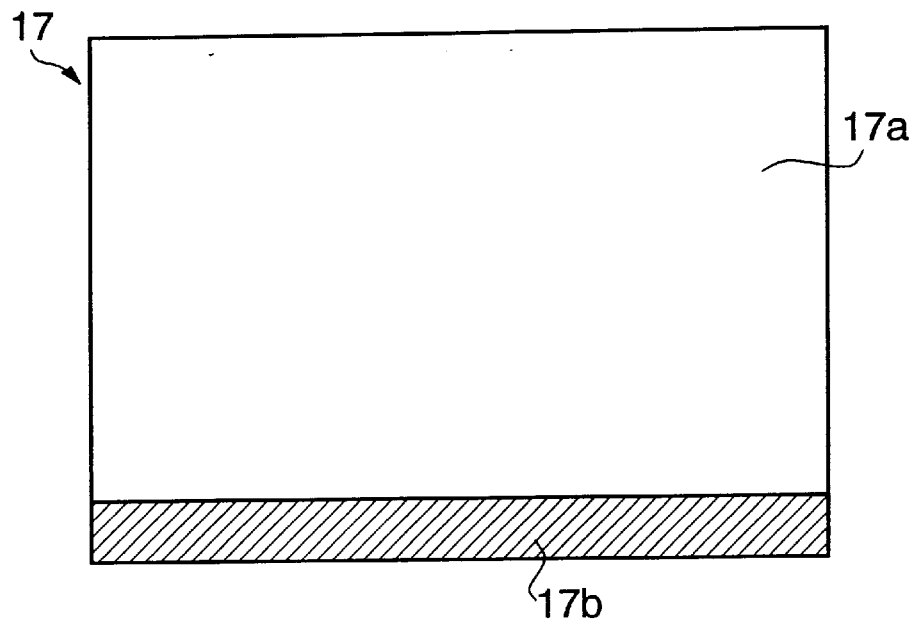
FIG. 3 shows a frame size of the displaying device and a frame size on a film.

FIG. 3 shows a frame of the displaying device, i.e., the screen of the LCD 17. The screen is divided into an image displaying area 17a and a blank area 17b. The blank area 17b is, as shown in FIG. 3, provided along a bottom edge of the frame of the screen of the LCD 17, etending horizontally in the drawing. The aspect ratio, i.e., the ratio of width to the height of the frame of the LCD 17 is 4:3, and the aspect ratio of the image displaying area 17a is 3:2. The aspect ratio of the LCD 17 is defined to be similar to that of the image receiving surface of the CCD 15, and the aspect ratio of the image displaying area 17a is similar to that of the photographing frame of the film 18. Further, the aspect ratio of the finder 4 is also similar to the image displaying area 17a, i.e., 3:2.

In this camera 100, the aspect ratio of the frame of the image displaying area 17a (i.e., 3:2) is greater than that of the image receiving area of the CCD 15 (i.e., 4:3). The blank area 17b is not used for displaying the image of the object to he recorded, but used for displaying a predetermined information.

Figure 4:
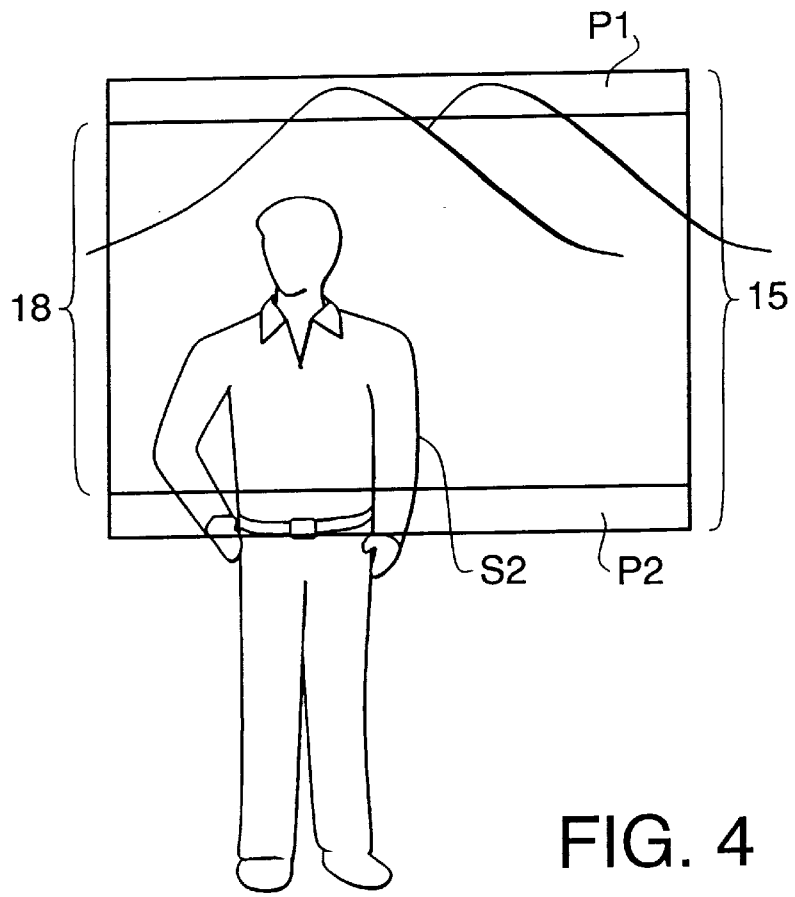
FIG. 4 shows sizes of frames of a CCD (Charge Coupled Device) and the film.
Figure 5:
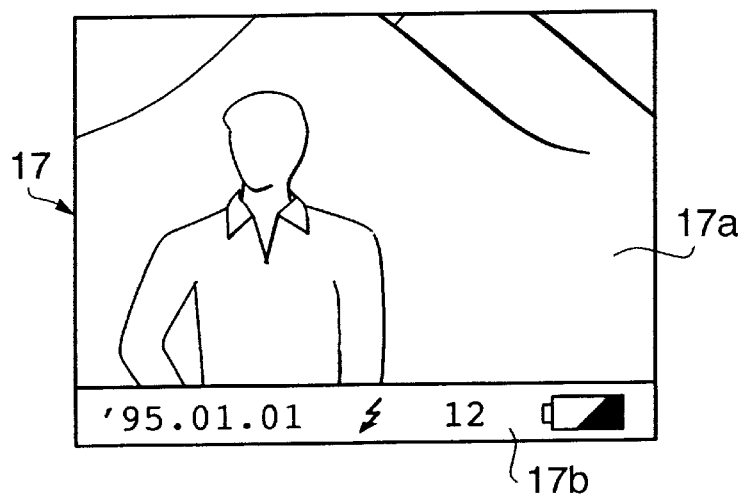
FIG. 5 shows the screen of the displaying device which displays an image of an object and a predetermined information.

FIG. 4 shows a relationship between the frame sizes of the CCD 15 and the film 18, and FIG. 5 shows the screen of the LCD 17 which displays the image of an object and the predetermined information.

As shown in FIG. 4, the aspect ratio of the image receiving surface of the CCD 15 is less than the aspect ratio of the photographing frame on the film 18. Therefore, an upper part P1 and/or a lower part P2 of the image captured by the CCD are not recorded on the film. As shown in FIG. 5, on the image displaying area 17a of the LCD 17, the image which is similar to the image formed on the film 18 is displayed. In other words, what is displayed on the image displaying area 17a completely corresponds to the image formed on the film 18.

On the blank area 17b, where the image captured by the CCD 15 is not displayed, information related to the image is displayed. The information may include date of photographing, an indication of whether a strobe is used, the number of used frames, a remaining amount of a battery, and the like.

Figure 6:
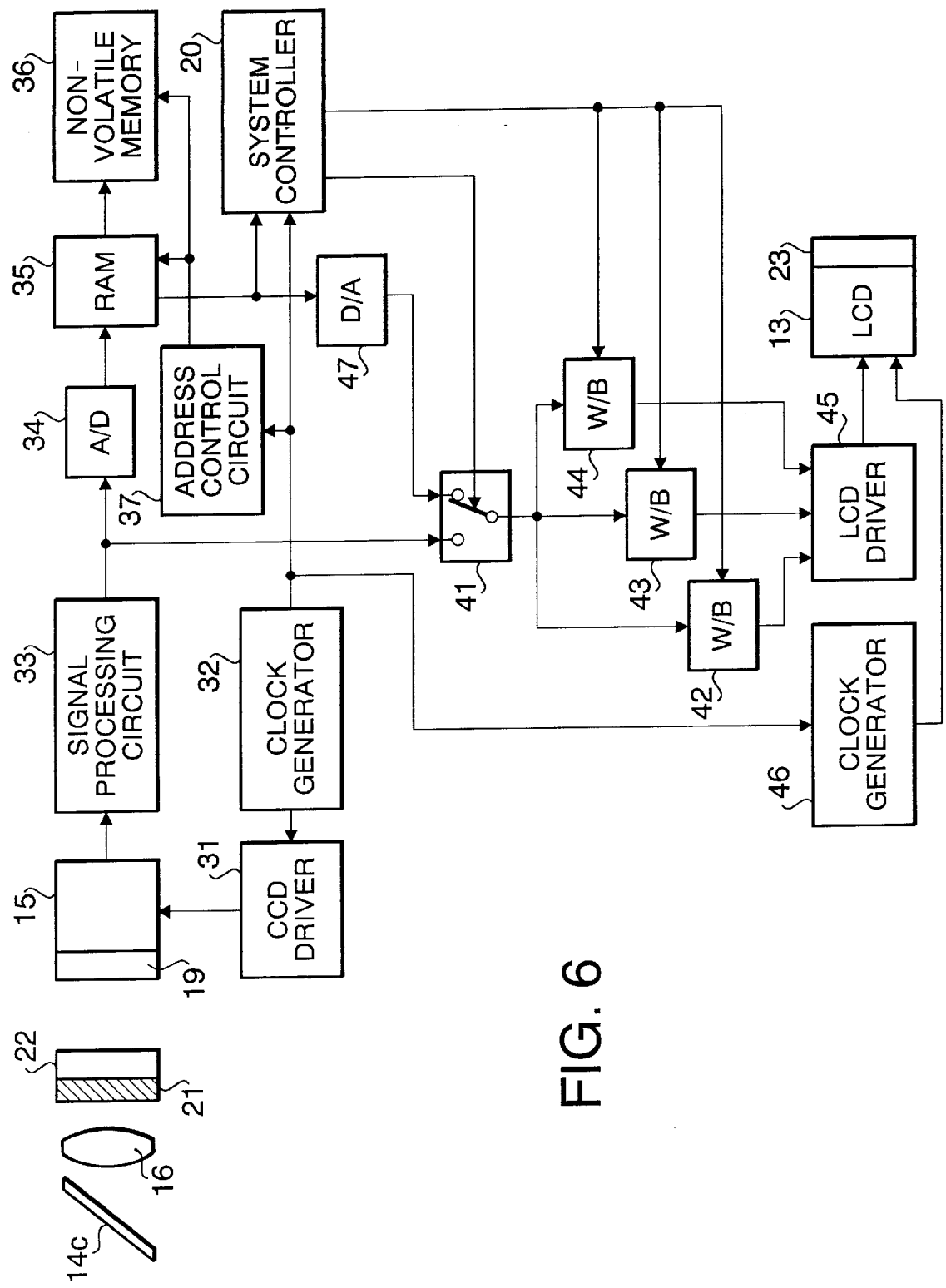
FIG. 6 is a block diagram illustrating a control system of the electronic still video camera shown in FIG. 1.

FIG. 6 is a block diagram illustrating a control system of the electronic still video camera 100.

A system controller 20 includes a micro processor which controls an entire operation of the camera 100. The electronic still video camera is capable of operating in a monitor through mode, a recording mode, or a reproducing mode.

When the camera operates in the monitor through mode, an animating image captured with use of the CCD 15 is displayed by the displaying device 13. When the camera operates in the recording mode, a still image is recorded on the film 18 and/or stored in a IC memory card (not shown). When the camera operates in the reproducing mode, the still image stored in a memory 36 is reproduced and displayed by the displaying device 13.

Between the converging lens 16 and the CCD 15, an infrared light cut filter 21 and an optical low-pass filter 22 are inserted as shown in FIG. 6. On the image receiving surface of the CCD 15, a color filter 19 is provided. Light passed through the half mirror 14c, and the converging lens 16 is directed onto the image receiving surface of the CCD 15. Each of the photodiodes provided on the image receiving surface of the CCD 15 respectively generates current in accordance with the intensity of received light, thereby generating image pixel signal corresponding to the object image.

The CCD 15 is driven by a CCD driver 31, which operates in response to a first clock, having a constant period, generated by a first clock generator 32. Specifically, synchronously with the first clock, the image pixel signal is transmitted from the CCD 15 to a signal processing circuit 33 having a relative dual sampling circuit, and the like.

The signal processing circuit 33 applies predetermined signal processing operations, including an elimination of reset noise, to the transmitted image pixel signal.

When the camera operates in the recording mode, an image pixel signal, which is an analog signal, output from the image processing circuit 33 is converted into a digital signal by an A/D (analog-to-digital) converter 34. The converted digital image pixel signal is temporarily stored in a RAM 35, which functions as a buffer, and then transferred to a non-volatile memory 36. Addressing of the RAM 35 and the non-volatile memory 36 are performed by an address control circuit 37 which operates in response to a clock signal generated from a clock signal generating circuit 32.

When the camera operates in the monitor through mode, the analog image pixel signal output from the image processing circuit 33 is transmitted in a first, second and third white balance controlling circuits 42, 43, and 44, through a switch unit 41. In the first white balance controlling circuit 42, a gain of red (R) signal is adjusted; in the second white balance controlling circuit 43, a gain of a green (G) signal is adjusted; and in the third white balance controlling circuit 44, a gain of a blue (B) signal is adjusted. Switching operation of the switch unit 41, and the adjustment of the white balance controlling circuits 42, 43 and 44 are controlled by the system controller 20.

The image pixel signals output from the white balance controlling circuits 42, 43, and 44 are transmitted to the displaying device 13 through an LCD driver 45. Thus, the animating (real time) image of the object S captured by the CCD 15 can be displayed on the LCD 17. The displaying device 13 operates in response to a second clock signal output from a second clock generator 46. Note that the second clock generator 46 generates the second clock signal based on the first clock signal output by the first clock signal generator 32.

When the camera operates in the reproducing mode, image signal data stored in the non-volatile memory 36 is transmitted in the RAM 35, and then converted into the analog signal by the D/A (digital-to-analog) converter 47. The output signal of the D/A converter 47 is input in the first, second and third white balance controllers 42, 43 and 44, and white balance is adjusted as is done in the monitor through mode. Then, the output Of the first, second and third white balance controllers 42, 43 and 44 are transmitted to the displaying device 13 and the image is displayed on the LCD 17.

Figure 7:
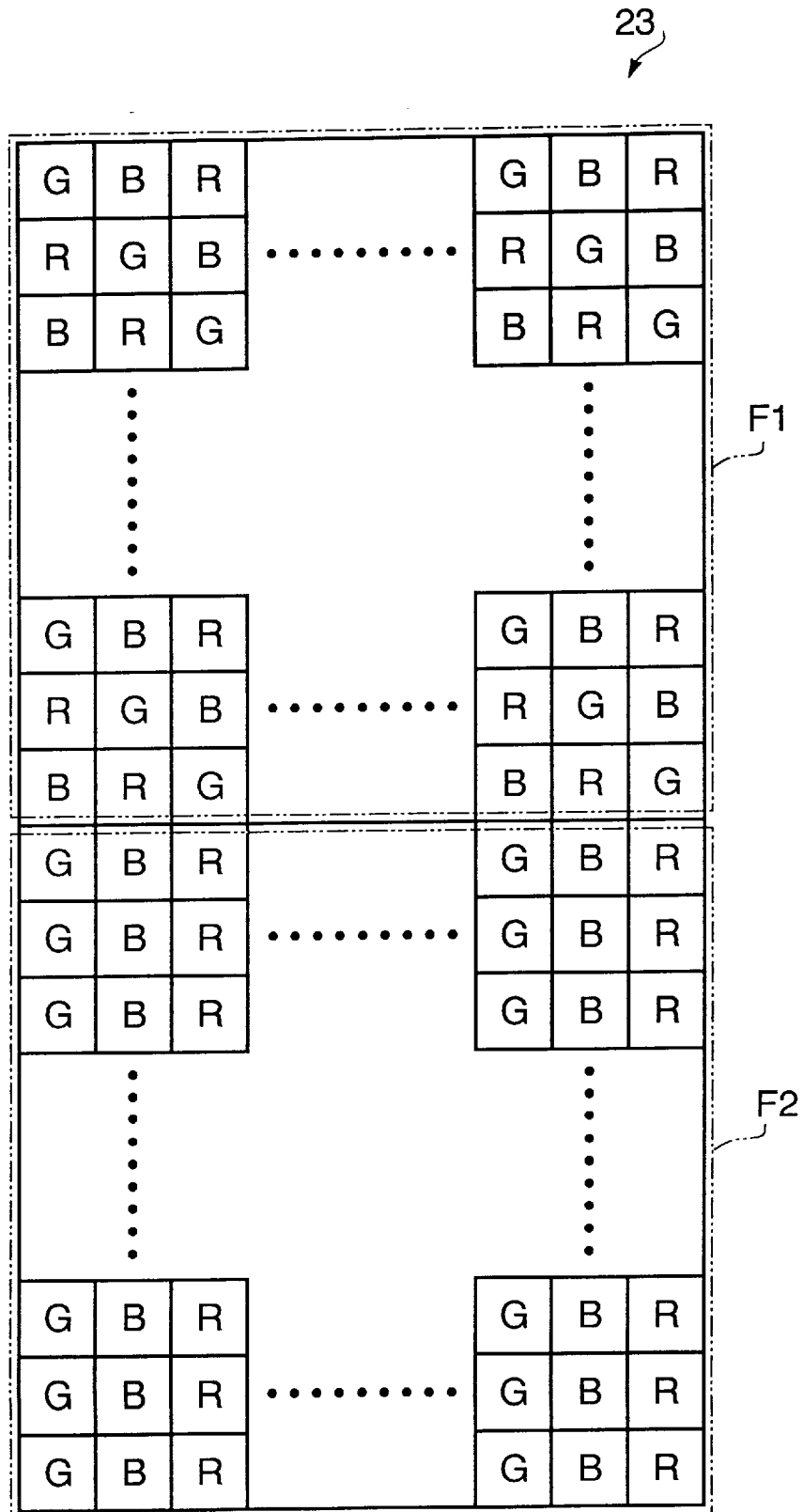
FIG. 7 shows a first example of a color filter provided on a screen of the displaying device.

FIG. 7 shows a first example of a color filter 23 provided on the screen of the displaying device. The color filter 23 has a first filter F1 and a second filter F2. The first filter F1 corresponds to the image displaying area 17a, and has a plurality of filter elements arranged in accordance with a first arrangement. The second filter F2 corresponds to the blank area 17b, and has a plurality of filter elements arranged in accordance with a second arrangement which is different from the first arrangement.

The first filter F1 has a R, G and B color filter elements arranged along inclined stripes. Specifically, filter elements for each color component are aligned along a line extending from the upper left to the lower right of the drawing. The second filter F2 also has the R, G and B color filter elements which are arranged along a normal stripes. That is, filters of each component are aligned along a line extending vertically.

It is known that with use of the arrangement as employed in the first filter F1, relatively high horizontal resolution can be obtained with respect to the second filter F2. On the other hand, with use of the arrangement employed in the second filter F2, the vertical line image is displayed clearly, and therefore, the second filter is better for displaying letters, chinese characters, lines, and the like. Accordingly, the first filter F1, which is an appropriate characteristic for the object image, is used for the image displaying area 17a, and the second filter F2, which is an appropriate characteristics for the lines, characters and the like, is used for the blank area 17b.

Figure 8:
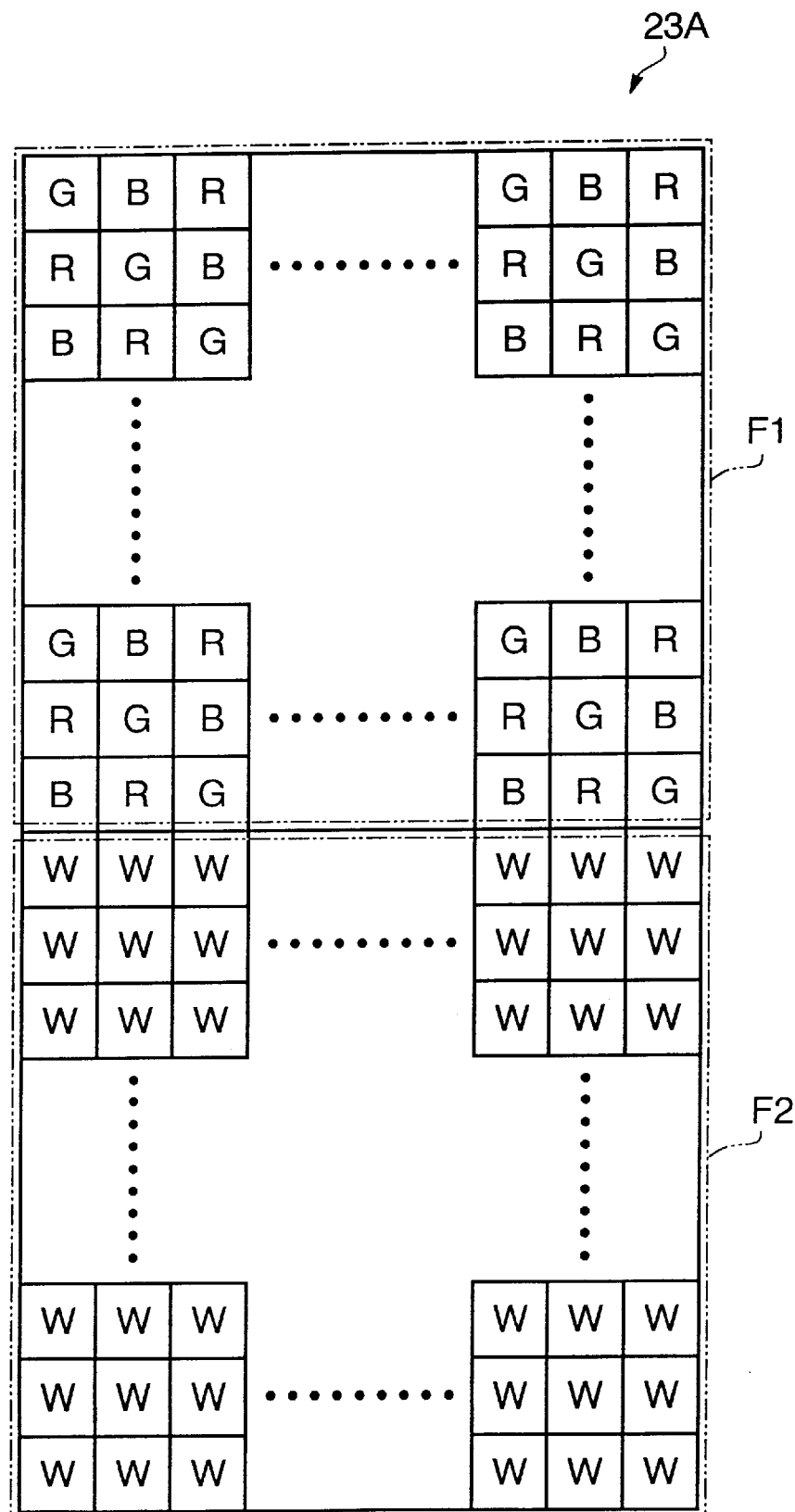
FIG. 8 shows second example of a color filter provided on the screen of the displaying device.

FIG. 8 shows a second example of the color filter 23, which also has a first filter F1 and a second filter F2. The elements of the first filter F1 are arranged similarly to the first example. The elements of the second filter are white filters. The second filter F2 of the second example is better for marks such as a pictogram indicating the remaining amount of a battery. Further, since the second filter consists of white filter elements, in comparison with the color filter elements, the amount of the light of the back light can be decreased, thereby, the power consumption of the battery is decreased.

Figure 9:
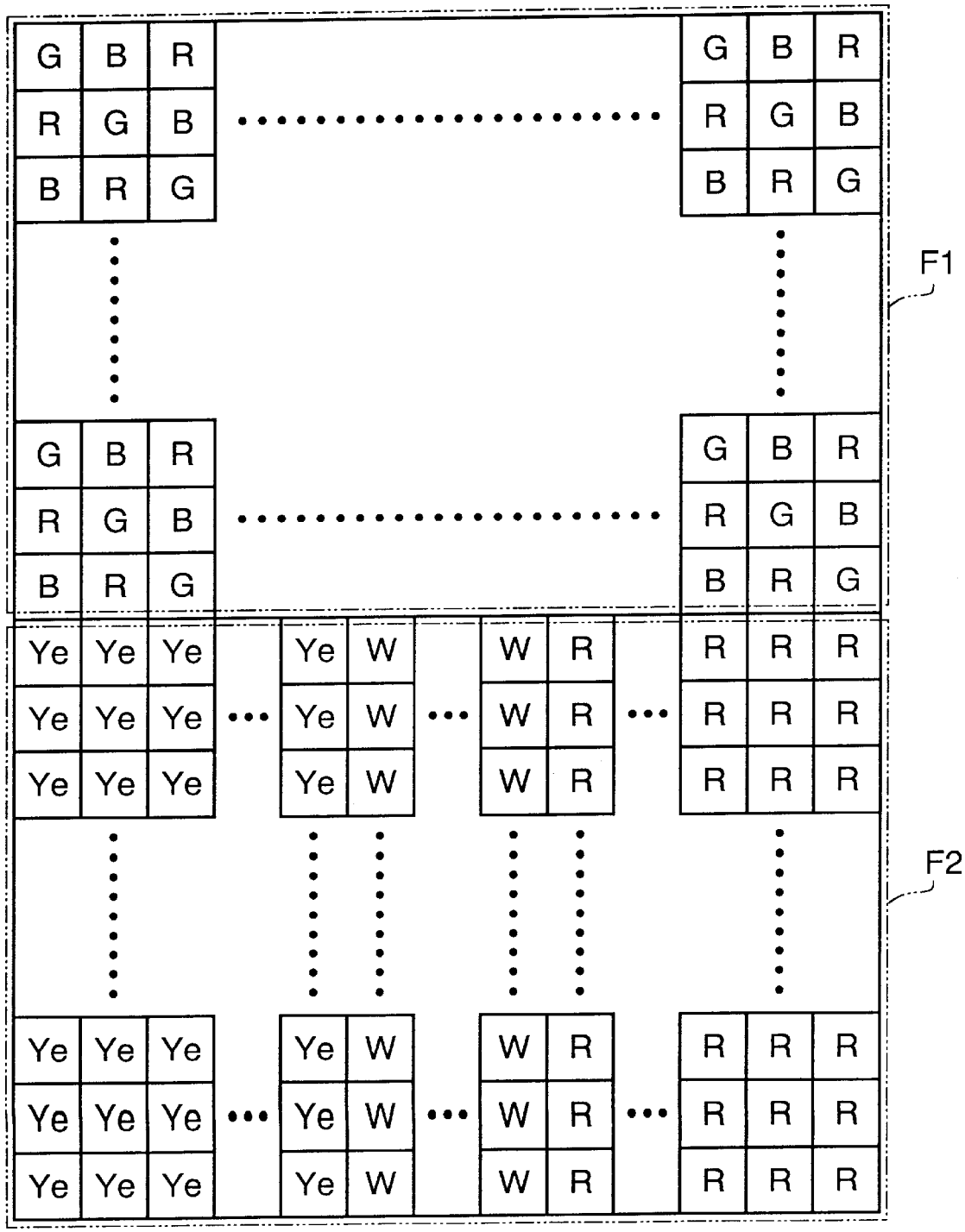
FIG. 9 shows a third example of a color filter provided on the screen of the displaying device.

FIG. 9 shows a third example of the color filter 23, which has a first filter F1 and a second filter F2. The first filter is similar to the first filter of the first example, and the second filter F2 has Yellow, White, and Red color filter elements. The white color filter elements are provided at a central area of the second filter F2; Yellow filter elements are provided on the left-hand side of the white filter elements; and Red filter elements are provided on the right-hand side of the white filter elements in the drawing. The second filter F2 of the third embodiment is appropriate for displaying yellow, black & white, and red marks within the blank area 17b.

As described above, the color filter 23 consists of the first filter F1 which is appropriate for displaying the image of the object, and the second filter F2 which is appropriate for displaying the information other than the image. In the first example, the color filter elements used in the first filter F1 and those in the second filter F2 are the same, only the arrangement being different. In the second and the third examples, at least one of the elements of the second filter F2 is different from the elements used in the first filter F1.

Figure 10:
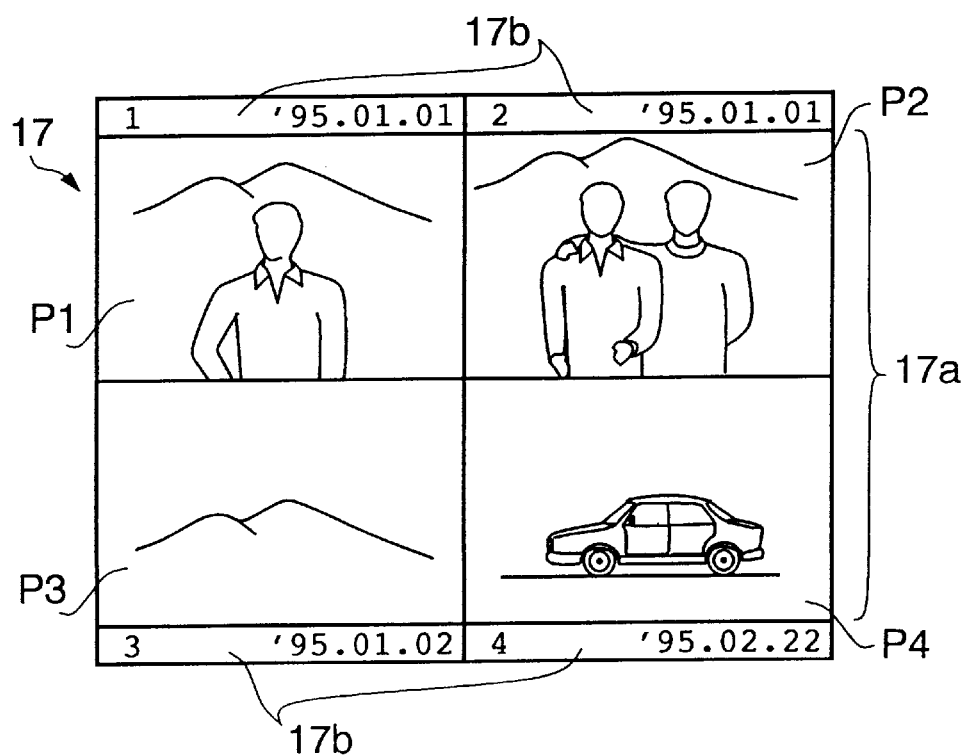
FIG. 10 shows the screen of the displaying device which displays an image of the object and predetermined information, which are different from the information shown in FIG. 5.

FIG. 10 shows another example of the image displayed on the LCD 17. In this example, four image frames P1, P2, P3 and P4 are displayed simultaneously. The first and second frames P1 and P2 are displayed in the upper half of the screen of the LCD 17, and the third and fourth frames are displayed in the lower half of the screen of the LCD 17. In this example, there are two blank areas 17b which are provided at the upper and bottom edge of the screen, and information related to the each frame is indicated at the blank areas 17b. If the image is displayed as shown in FIG. 10, it is preferable that the central part of the color filter, which corresponds to the image displaying area 17a, has color filter elements arranged in the inclined stripe arrangement, and the areas corresponding to the blank area 17b has color filter elements arranged in the vertical stripe arrangement, or has white filter elements.

Figure 11:
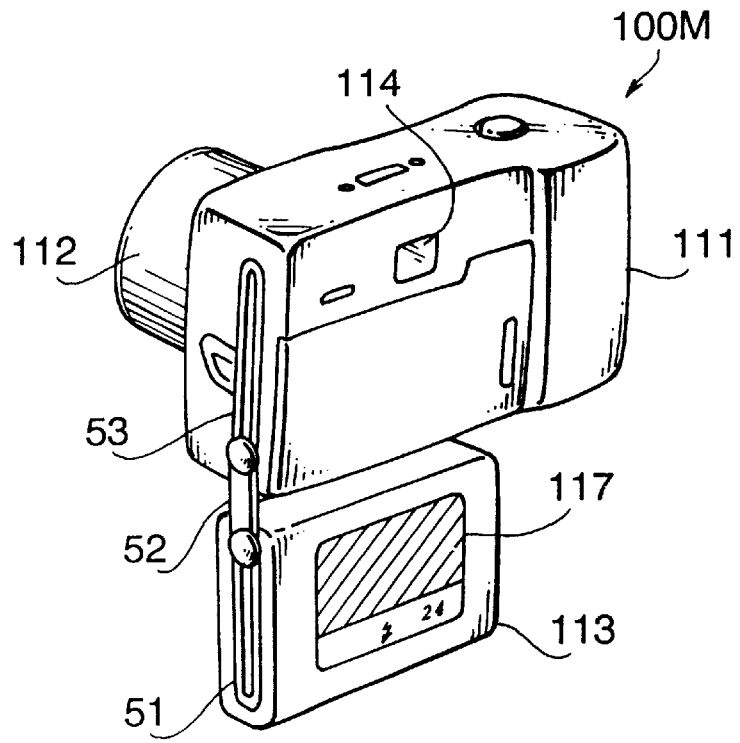
FIG. 11 is a perspective view, seen from backwards, of another electronic still video camera provided with second embodiment of the displaying device.
Figure 12:
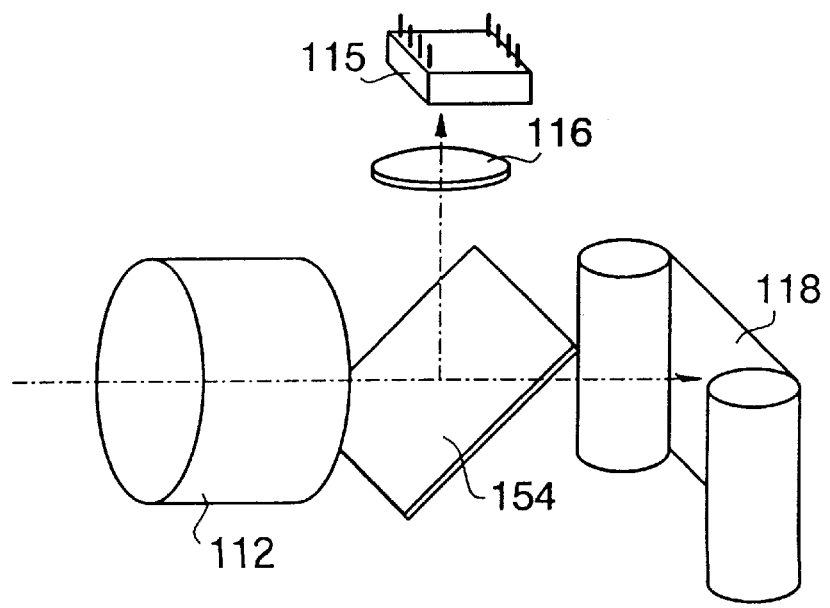
FIG. 12 shows a schematic structure of a finder optical system employed in the camera shown in FIG. 11.

FIG. 11 is a perspective view, seen from backwards, of another electronic still video camera 100M provided with a second embodiment of the displaying device 113. FIG. 12 shows a schematic structure of a finder optical system employed in the camera 100M shown in FIG. 11.

The camera 100M has a camera body 111 and a displaying device 113 which is separate from the body 111 of the camera 100M. On a front surface of the camera 100M, a lens unit 112 is provided, and on a back surface of the camera 100M, a finder window 114 is formed.

A rail member 51 is secured on the side wall of the displaying device 113. Similarly, on the side wall of the camera body 111, another rail member 53 is secured. The rail members 51 and 53 are linked by means of a link member 52. Both ends of the link member 52 are slidably and rotatably supported by the rail members 51 and 53. Because of this structure, the displaying device 113 can be positioned such that the screen of an LCD 117 faces a back surface of the camera body 11. The circuitry of the displaying device 113 is similar to that of the first embodiment and a description thereof is omitted.

In the second embodiment, between the lens unit 112 and a film 118, a quick return mirror 154 is provided. Above the quick return mirror 154, a converging lens 116 and a CCD 115 are provided The quick return mirror 154 is located at the position shown in FIG. 12 when an object is observed by the operator, and in this condition, the object image is formed on the CCD 115 When the object is photographed (the film 118 is exposed to the object image), the quick return mirror 54 moves till it lies horizontally. After the film 118 is exposed to the optical image of the object, the quick return mirror 154 returns to its initial position, which is shown in The drawing.

In FIG. 12, it is possible to arrange a shutter device (or an aperture control device) in front of the film 118. With this structure, instead of the quick return mirror 154, a half mirror can be used with its position being fixed. In such a case, the mechanism for moving the quick return mirror 154 can be omitted, which enables the camera 100M to be made further compact and light.

In the above described embodiments, the cameras 100 and 100M employ the film as a recording medium. However, the camera is not necessarily limited to one employing film as a recording medium. The invention is applicable to any camera using any kind of recording medium, such as a floppy disk, IC memory card, and the like.

The present disclosure relates to subject matter contained in Japanese Patent Application No. HEI 7-278428, filed on Oct. 2, 1995, which is expressly incorporated herein by reference in its entirety.

What is claimed is:

1. A display device which displays images in response to an image signal obtained by an image receiving element, said device comprising:

a displaying screen having at least first and second displaying areas, an image being displayed on said first displaying area, information different from said image displayed on said first displaying area being displayed on said second displaying area, an aspect ratio of said first displaying area being greater than an aspect ratio of said displaying screen, an aspect ratio of said displaying screen being the same as an aspect ratio of an image receiving surface of said image receiving element, a width of said first displaying area being the same as a width of said displaying screen;

a color filter provided on said displaying screen, said color filter being divided into at least first and second filter areas respectively corresponding to said at least first and second displaying areas, said first filter area comprises a plurality of filter elements arranged in accordance with a first arrangement, and said second filter area comprises a plurality of filter elements arranged in accordance with a second arrangement which is different from said first arrangement.

2. The displaying device according to claim 1, wherein said second displaying area is provided along at least one side of said displaying screen.

3. The display device according to claim 2, wherein two second displaying areas are provided along opposite sides of said displaying screen.

4. The displaying device according to claim 1, wherein said aspect ratio of said displaying screen is 3:2 and said aspect ratio of said image receiving surface is 4:3.

5. The display device according to claim 1, wherein said first filter elements fall within elements corresponding to a plurality of color components, and wherein said second filter elements fall within elements corresponding to a plurality of color components, wherein at least one color component corresponding to said second filter elements is different from a color component corresponding to said first filter elements.

6. The display device according to claim 1, wherein said first arrangement comprises an inclined strike arrangement.

7. The display device according to claim 1, wherein said second arrangement comprises a verticals stripe arrangement.

8. The display device according to claim 1, wherein said second color filter elements comprises of white color elements.

9. The display device according to claim 1, wherein said second color filter elements comprises a plurality of parts having color filter elements for different colors.

10. The displaying device according to claim 9, wherein said different colors are yellow, white and red.

11. An image recording apparatus for recording image information to a recording medium, comprising:

a display device having a displaying screen, said display device displaying images in response to an image signal obtained from an image receiving element, said displaying screen having at least first and second displaying areas, an image being displayed on said first displaying area, information different from said image displayed on said first area being displayed on said second displaying area, an aspect ratio of said first displaying area being greater than an aspect ratio of said displaying screen, the aspect ratio of said displaying screen being the same as an aspect ratio of an image receiving surface of said image receiving element, a width of said first displaying area being the same as a width of said displaying screen;

a color filter provided on said displaying screen, said color filter being divided into at least first and second filter areas respectively corresponding to said at least first and second displaying areas, said first filter area comprises a plurality of filter elements arranged in accordance with a first arrangement, and said second filter area comprises a plurality of filter elements arranged in accordance with a second arrangement which is different from said first arrangement.

12. The image recording apparatus according to claim 11, wherein an entire image displayed on said first displaying area is recorded to said recording medium.

13. The image recording apparatus according to claim 12, wherein said recording medium comprises a film, and wherein said display device comprises a liquid crystal display.

14. The display device according to claim 1, said first and second displaying areas being continuous with each other.

15. The image recording apparatus of claim 11, said first and second displaying areas being continuous with each other.

16. A display device comprising:

a displaying screen having at least first display area and a second display area, said first display area being divided into at least four first display sub-areas, distinct images being displayable on each of said at least four first display sub-areas, said second display area being subdivided into a number of second display sub-areas equal to a number of said first display sub-areas, information different from said images displayed in said first display sub-areas being displayable on each of said second display sub-areas, each of said second display sub-areas being contiguous with a respective one of said first display sub-areas;

a color filter provided on said displaying screen, said color filter being divided into at least first and second filter areas respectively corresponding to said at least first and second display areas;

said first filter area comprising a plurality of filter elements arranged in accordance with a first arrangement, and said second filter area comprising a plurality of filter elements arranged in accordance with a second arrangement which is different from said first arrangement.

17. The display device according to claim 16, an aspect ratio of said first display area being greater than an aspect ratio of said displaying screen.

18. The displaying device according to claim 17, said displaying device displaying images in response to an image signal obtained by an image receiving element, the aspect ratio of said first display area being greater than an aspect ratio of an image receiving surface of said image receiving element.

19. The displaying device according to claim 18, an aspect ratio of said displaying screen being similar to the aspect ratio of said image receiving surface.

20. The displaying device according to claim 16, said first arrangement comprising an inclined stripe arrangement and said second arrangement comprising a vertical stripe arrangement.

21. The displaying device according to claim 16, said filter elements of said second filter area comprising white color elements.

22. The display device according to claim 16, said filter elements of second filter area comprising a plurality of parts having color filter elements for different colors.

23. The display device according to claim 22, wherein said different colors are yellow, white and red.

* * * * *